United States Patent
Perez et al.

(10) Patent No.: US 6,331,343 B1
(45) Date of Patent: Dec. 18, 2001

(54) FILMS HAVING A FIBRILLATED SURFACE AND METHOD OF MAKING

(75) Inventors: Mario A. Perez, Burnsville; Sundaravel Damodaran; Michael D. Swan, both of Maplewood, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/307,577

(22) Filed: May 7, 1999

(51) Int. Cl.$^7$ .................................................. B32B 5/24
(52) U.S. Cl. ..................... 428/141; 428/143; 428/147; 428/152; 428/155; 428/910; 442/408; 264/504
(58) Field of Search ........................... 428/141, 143, 428/147, 152, 155, 910; 442/408; 264/504

(56) References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/133 |
| 3,318,852 | 5/1967 | Dixon | 260/78.5 |
| 3,470,594 | 10/1969 | Kim | 28/72 |
| 3,473,206 | 10/1969 | Boultinghouse | 28/72 |
| 3,500,626 | 3/1970 | Sandiford | 57/140 |
| 3,502,497 | 3/1970 | Crocker | 117/68.5 |
| 3,565,985 | 2/1971 | Schrenk et al. | 264/171 |
| 3,695,025 | 10/1972 | Gibbon | 57/140 |
| 3,773,608 | 11/1973 | Yoshimura et al. | 161/168 |
| 4,134,951 | 1/1979 | Dow et al. | 264/147 |
| 4,241,198 | 12/1980 | Kobayashi | 525/360 |
| 4,330,499 | 5/1982 | von und zu Aufsess et al. | 264/289.6 |
| 4,377,616 | 3/1983 | Ashcroft et al. | 428/213 |
| 4,425,402 | 1/1984 | Camprincoli | 428/330 |
| 4,595,738 | 6/1986 | Hufnagel et al. | 526/348.1 |
| 4,675,582 | 6/1987 | Hommes et al. | 318/38 |
| 4,701,369 | 10/1987 | Duncan | 428/313.9 |
| 4,728,571 | 3/1988 | Clemens et al. | 428/352 |
| 4,825,111 | 4/1989 | Hommes et al. | 310/12 |
| 4,853,602 | 8/1989 | Hommes et al. | 318/38 |
| 4,921,652 | 5/1990 | Tsuji et al. | 264/41 |
| 4,929,029 | 5/1990 | Deziel et al. | 300/21 |
| 5,032,460 | 7/1991 | Kantner et al. | 428/447 |
| 5,036,262 | 7/1991 | Schonback | 318/38 |
| 5,051,225 | 9/1991 | Hommes et al. | 264/288.4 |
| 5,072,493 | 12/1991 | Hommes et al. | 26/72 |
| 5,202,190 | 4/1993 | Kantner et al. | 428/449 |
| 5,214,119 | 5/1993 | Leir et al. | 528/28 |
| 5,290,615 | 3/1994 | Tushaus et al. | 428/40 |
| 5,356,706 | 10/1994 | Shores | 428/352 |
| 5,389,324 | 2/1995 | Lewis et al. | 264/171 |
| 5,427,842 | 6/1995 | Bland et al. | 428/213 |
| 5,589,122 | 12/1996 | Leonard et al. | 264/146 |
| 5,594,070 | 1/1997 | Jacoby et al. | 525/88 |
| 5,599,602 | 2/1997 | Leonard et al. | 428/56 |
| 5,660,922 | 8/1997 | Herridge et al. | 428/214 |
| 5,709,651 | 1/1998 | Ward | 602/57 |
| 5,750,630 | 5/1998 | Sengupta | 528/59 |
| 5,770,144 | 6/1998 | James et al. | 264/504 |
| 5,811,493 | 9/1998 | Kent | 525/92 |
| 5,861,213 | 1/1999 | Ohmory et al. | 428/397 |
| 5,910,277 | 6/1999 | Ishino et al. | 264/127 |
| 5,945,215 | 8/1999 | Bersted et al. | 428/364 |
| 5,945,221 | 8/1999 | Tsai et al. | 428/412 |
| 6,124,058 | 9/2000 | Ohmory et al. | 429/247 |

FOREIGN PATENT DOCUMENTS

| | | |
|---|---|---|
| 0027273 | 4/1981 | (EP) . |
| 0164235 | 12/1985 | (EP) . |
| 51033152 | 9/1976 | (JP) . |

OTHER PUBLICATIONS

S. Piccarolo et al., *Journal of Applied Polymer Science*, vol. 46, 1992, pp. 625–634.

Jones et al., *Makromol. Chem.*, vol. 75, 1964, pp. 134–158.

J. Karger–Kocsis, Polypropylene: Structure, Blends and Composites, vol. 1, 1994, pp. 130–131.

*Primary Examiner*—William P. Watkins, III
(74) *Attorney, Agent, or Firm*—Kent S. Kokko (57) ABSTRACT

Fibers and fibrillated articles are provided by imparting fluid energy to at least one surface of a highly oriented, voided, melt-processed polymeric film. The fibers and fibrillated articles are useful as tape backings, filters, thermal and acoustical insulation and as reinforcement fibers for polymers or cast building materials such as concrete.

18 Claims, 5 Drawing Sheets

FILMS HAVING A FIBRILLATED SURFACE AND METHOD OF MAKING

FIELD OF THE INVENTION

The present invention relates to high-strength, melt-processed films having a fibrous surface, and methods of making the same. The films of the invention can be prepared by imparting fluid energy, typically in the form of ultrasound or high-pressure water jets, to an oriented, melt processed film comprising a semicrystalline polymer and void initiating component. Fibrous films of the invention find use as tape backings, paper-like substrates for printing or graphics, filters, fibrous mats and thermal and acoustical insulation.

BACKGROUND OF THE INVENTION

Polymeric fibers have been known essentially since the beginnings of commercial polymer development. The production of polymer fibers from polymer films is also well known. In particular, the ease with which films produce fibers (i.e., fibrillate) can be correlated to the degree of molecular orientation of the polymer fibrils that make up the film.

Porous and microporous films have been prepared by extruding thermoplastic polymers, followed by orientation of the film. U.S. Pat. No. 5,811,493 (Kent) describes extruding a composition comprising a polyester continuous phase, a thermoplastic polyolefin discrete phase and a polyester-polyether diblock compatibilizer, followed by orientation. U.S. Pat. No. 4,921,652 (Tsuji et al.) describes melt-molding a blend of an inorganic fine powder with a polyolefin, followed by stretching. U.S. Pat. No. 4,377,616 (Ashcroft et al.) describes a biaxially oriented polymer film comprising a voided, thermoplastic matrix material where the voids are created within the matrix by inclusion of spherical void-initiating solid particles which are incompatible with the matrix material.

Orientation of semicrystalline polymeric films and fibers has been accomplished in numerous ways, including melt spinning, melt transformation (co)extrusion, solid state coextrusion, gel drawing, solid state rolling, die drawing, solid state drawing, and roll-trusion, among others. Each of these methods has been successful in preparing oriented, high modulus polymer fibers and films. Most solid-state processing methods have been limited to slow production rates, on the order of a few cm/min. Methods involving gel drawing can be fast, but require additional solvent-handling steps. A combination of rolling and drawing solid polymer sheets, particularly polyolefin sheets, has been described in which a polymer billet is deformed biaxially in a two-roll calender then additionally drawn in length (i.e., the machine direction). Methods that relate to other web handling equipment have been used to achieve molecular orientation, including an initial nip or calender step followed by stretching in both the machine direction or transversely to the film length.

SUMMARY OF THE INVENTION

The present invention is directed to novel oriented films having at least one fibrous surface, said films comprising a melt-processed immiscible mixture of a semicrystalline polymer component and a void-initiating component. The fibrous surface of the film advantageously provides a greater surface area making films especially useful in applications such as ink-receptive substrates, wipes, paper-like films and as backings for tapes. The surface area is generally greater than about 0.25 m$^2$/gram, typically about 0.5 to 30 m$^2$/g.

The present invention is further directed toward the preparation of oriented films having a fibrous surface by the steps of providing an oriented polymer film comprising an immiscible mixture of a crystalline polymer component and a void-initiating component, stretching the film along at least one major axis (uniaxial orientation) to impart a voided morphology thereto, optionally stretching the film along a second major axis (biaxial orientation), and then fibrillating the voided film by imparting sufficient fluid energy thereto.

The films may be uniaxially oriented to produce a fibrous surface having polymeric microfibers of average effective diameter of less than 20 microns, generally from 0.01 to 10 microns, and substantially rectangular in cross section, having a transverse aspect ratio (width to thickness) of from 1.5:1 to 20:1. Further, due to their highly oriented morphology, the microfibers of the present invention, produced from uniaxially oriented films, have very high modulus making them especially useful as reinforcing fibers in thermoset resin and concrete. Alternatively, the films may be biaxially oriented to produce a fibrous surface of fibrous flakes that are thin in cross-section, in comparison to the width and lengths, and irregular in shape. The fibrous flakes impart a large surface area to the film are particularly useful as adherent surfaces for bonding or fastening.

Advantageously the process of the invention is capable of high rates of production, is suitable as an industrial process and uses readily available polymers. Further, the use of immiscible mixtures allows for fibrillation of the film surfaces with less imparted energy as compared to the fibrillation of a single component polymer film. The fibers and fibrous articles of this invention, having extremely small fiber diameter and both high strength and modulus, are useful as tape backings, strapping materials, films with unique optical properties and high surface area, low density reinforcements for thermosets, impact modifiers or crack propagation prevention in matrices such as concrete, as paper-like substrates for printing or graphics, and as fibrillar forms (dental floss or nonwovens, for example).

DETAILED DESCRIPTION

Semicrystalline polymers useful as the first polymer component in the immiscible mixture include any melt-processible crystalline, semicrystalline or crystallizable polymers or copolymers, including block, graft and random copolymers. Semicrystalline polymers consist of a mixture of amorphous regions and crystalline regions. The crystalline regions are more ordered and segments of the chains actually pack in crystalline lattices. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers remain amorphous and show no tendency to crystallize. Some polymers can be made semicrystalline by heat treatments, stretching or orienting and by solvent inducement, and these processes can control the degree of true crystallinity.

Semicrystalline polymers useful in the present invention include, but are not limited to, high and low density polyethylene, linear low density polyethylene, polypropylene, polyoxymethylene, poly(vinylidine fluoride), poly(methyl pentene), poly(ethylene-chlorotrifluoroethylene), poly(vinyl fluoride), poly(vinyl alcohol), poly(ethylene oxide), poly(ethylene terephthalate), poly(butylene terephthalate), nylon 6, nylon 66, polybutene, syndiotactic polystyrene and thermotropic liquid crystal polymers. Examples of suitable thermotropic liquid crystal polymers include aromatic polyesters which exhibit liquid crystal properties when melted and which are synthesized from aromatic diols, aromatic carboxylic acids, hydroxycarboxylic acids, and other like monomers. Typical examples include a first type consisting of parahydroxybenzoic acid (PHB), terephthalic acid, and biphenol; a second type consisting of PHB and 2,6-hydroxynaphthoic acid; and a third type consisting of PHB, terephthalic acid, and ethylene glycol. Preferred polymers are polyolefins such as polypropylene and polyethylene that are readily available at low cost and can provide highly desirable properties in the fibrillated articles such as high modulus and high tensile strength.

The semicrystalline polymer component may further comprise small amounts of a second polymer to impart desired properties to the fibrillated film of the invention. The second polymer of such blends may be semicrystalline or amorphous and is generally less than 30 weight percent, based of the weight of the semicrystalline polymer component. For example, small amounts of linear low density polyethylene may be added to polypropylene, when used as the semicrystalline polymer component, to improve the softness and drapability of the fibrillated film. Small amounts of other polymers may be added, for example, to enhance stiffness, crack resistance, Elmendorff tear strength, elongation, tensile strength and impact strength, as is known in the art.

The void-initiating component is chosen so as to be immiscible in the semicrystalline polymer component. It may be an organic or an inorganic solid having an average particle size of from about 0.1 to 10.0 microns and may be any shape including amorphous shapes, spindles, plates, diamonds, cubes, and spheres. Useful inorganic solids useful as void initiating components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates or sulfates; kaolin, talc, carbon black and the like. Inorganic void initiating components are chosen so as to have little surface interaction, due to either chemical nature or physical shapes, when dispersed in the semicrystalline polymer component. In general the inorganic void initiating components should not be chemically reactive with the semicrystalline polymer component, including Lewis acid/base interactions, and have minimal van der Waals interactions.

Preferably the void initiating component comprises a thermoplastic polymer, including semicrystalline polymers and amorphous polymers, to provide a blend immiscible with the semicrystalline polymer component. An immiscible blend shows multiple amorphous phases as determined, for example, by the presence of multiple amorphous glass transition temperatures. As used herein, "immiscibility" refers to polymer blends with limited solubility and non-zero interfacial tension, i.e. a blend whose free energy of mixing is greater than zero:

$$\alpha G_m \cong \alpha H_m > 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, Flory-Huggins interaction parameter between two non-polar polymers is always a positive number.

Polymers useful as the void-initiating component include the above described semicrystalline polymers, as well as amorphous polymers, selected so as to form discrete phases upon cooling from the melt. Useful amorphous polymers include, but are not limited to, polystyrene, polymethymethacrylate, polycarbonate, cyclic olefin copolymers (COC's) such as ethylene norbornene copolymers, and toughening polymers such as styrene/butadiene rubber (SBR) and ethylene/propylene/diene rubber (EPDM).

Specific useful combinations of immiscible polymer blends include, for example, polypropylene and polybutylene terphthalate, polypropylene and polyethylene terphthalate, polypropylene and polystyrene, polypropylene and high density polyethylene, polypropylene and low density polyethylene, polypropylene and polycarbonate, polypropylene and polymethylpentene; and polypropylene and nylon.

When using an immiscible polymer blend, the relative amounts of the semicrystalline polymer component and void initiating polymer component can be chosen so the first polymer forms a continuous phase and the second polymer forms a discontinuous phase, or that the second polymer forms a continuous phase and the first polymer forms a discontinuous phase, or each polymer forms a continuous phase; as in an interpenetrating polymer network. The relative amounts of each polymer can vary widely, from 99:1 to 1:99 weight ratio. Preferably, the semicrystalline polymer component forms the continuous phase while the void initiating component forms a discontinuous, or discrete phase, dispersed within the continuous phase of the first polymer. In such constructions, the amount of void initiating component will affect final film properties. In general, as the amount of the void initiating component increases, the amount of voiding in the final film also increases. As a result, properties that are affected by the amount of voiding in the film, such as mechanical properties, density, light transmission, etc., will depend upon the amount of added void initiating component. When the void initiating component is a polymer, as the amount of void initiating polymer in the blend is increased, a composition range will be reached at which the void initiating polymer can no longer be easily identified as the dispersed, or discrete, phase. Further increase in the amount of void initiating polymer in the blend will result in a phase inversion wherein the void initiating polymer becomes the continuous phase.

Preferably, whether the void initiating component is organic or inorganic, the amount of the void initiating component in the composition is from 1% by weight to 49% by weight, more preferably from 5% by weight to 40% by weight, most preferably from 10% by weight to 25% by weight. In these composition ranges, the first semicrystalline polymer forms a continuous phase, while the void initiating component forms the discrete, discontinuous phase.

Additionally, the selected void initiating component must be immiscible with the semicrystalline polymer component selected. In this context, immiscibility means that the discrete phase does not dissolve into the continuous phase in a substantial fashion, i.e., the discrete phase must form separate, identifiable domains within the matrix provided by the continuous phase.

The molecular weight of each polymer should be chosen so that the polymer is melt processible under the processing conditions. For polypropylene and polyethylene, for example, the molecular weight may be from about 5000 to 500,000 and is preferably from about 100,000 to 300,000.

In order to obtain the maximum physical properties and render the polymer film amenable to fibrillation, the polymer chains need to be oriented along at least one major axis (uniaxial), and may further be oriented along two major axes (biaxial). The degree of molecular orientation is generally defined by the draw ratio, that is, the ratio of the final length to the original length. This orientation may be effected by a combination of techniques in the present invention, including the steps of calendering and length orienting.

In the present invention, a melt-processed film comprising an immiscible polymer mixture is provided. It is preferred that the crystallinity of the semicrystalline polymer component be increased by an optimal combination of casting and subsequent processing such as calendering, annealing, stretching and recrystallization. It is believed that maximizing the crystallinity of the film will increase fibrillation efficiency.

Upon orientation, voids are imparted to the film. As the film is stretched, the two components separate due to the immiscibility of the two components and poor adhesion between the two phases. When the film comprise a continuous phase and a discontinuous phase, the discontinuous phase serves to initiate voids which remain as substantially discrete, discontinuous voids in the matrix of the continuous phase. When two continuous phases are present, the voids that form are substantially continuous throughout the polymer film. Typical voids have major dimensions X and Y, proportional to the degree of orientation in the machine and transverse direction respectively. A minor dimension Z, normal to the plane of the film, remains substantially the same as the cross-sectional dimension of the discrete phase (void initiating component) prior to orientation. Voids arise due to poor stress transfer between the phases of the immiscible blend. It is believed that low molecular attractive forces between the blend components are responsible for immiscible phase behavior; low interfacial tension results in void formation when the films are stressed by orientation or stretching.

Unexpectedly, it has been found it voids may be imparted to the two component (semicrystalline and void initiating) polymer films under condition far less severe than those necessary to impart voids to single component films. It is believed that the immiscible blend, with limited solubility of the two phases and a free energy of mixing greater than zero, facilitates the formation of the voids necessary for subsequent fibrillation.

The conditions for orientation are chosen such that the integrity of the film is maintained. Thus when stretching in the machine and/or transverse directions, the temperature is chosen such that substantial tearing or fragmentation of the continuous phase is avoided and film integrity is maintained. The film is particularly vulnerable to tearing or even catastrophic failure if the temperature is too low, or the orientation ratio(s) is/are excessively high. Preferably, the orientation temperature is above the glass transition temperature of the continuous phase. Such temperature conditions permit maximum orientation in the X and Y directions without loss of film integrity, maximize voiding imparted to the film and consequently and maximizing the ease with which the surface(s) may be fibrillated.

Voids are relatively planar in shape, irregular in size and lack distinct boundaries. Voids are generally coplanar with the film, with major axes in the machine (X) and transverse (Y) directions (directions of orientation). The size of the voids is variable and proportional to the size of the discrete phase and degree of orientation. Films having relatively large domains of discrete phase and/or relatively high degrees of orientation will produce relatively large voids. Films having a high proportion of discrete phases will generally produce films having a relatively high void content on orientation. Void size, distribution and amount in the film matrix may be determined by techniques such as small angle x-ray scattering (SAXS), confocal microscopy, scanning electron microscopy (SEM) or density measurement. Additionally, visual inspection of a film may reveal enhanced opacity or a silvery appearance due to significant void content.

Generally, greater void content enhances the subsequent fibrillation, and subsequently, using the process of this invention, for uniaxially oriented films, the greater the yield of fibers and for biaxially oriented films, the greater the yield of fibrous flakes. Preferably, when preparing an article having at least one fibrillated surface, the polymer film should have a void content in excess of 5%, more preferably in excess of 10%, as measured by density; i.e., the ratio of the density of the voided film with that of the starting film.

In practice, the films first may be subjected to one or more processing steps to impart the desired degree of crystallinity to the semicrystalline polymer component, and further processed to impart the voids, or the voids may be imparted coincident with the process step(s) which impart crystallinity. Thus the same calendering or stretching steps that orient the polymer film and enhance the crystallinity (and orientation) of the polymer may concurrently impart voids.

In one embodiment of the present invention, the polymer is extruded from the melt through a die in the form of a film or sheet and quenched to maximize the crystallinity of the semicrystalline phase by retarding or minimizing the rate of cooling. As the semicrystalline phase cools from the melt, it begins to crystallize and spherulites form from the developing crystallites. If cooled rapidly from a temperature above its melting point to a temperature well below the crystallization temperature, a structure is produced comprising crystallites surrounded by large amorphous regions, and the size of the spherulites is minimized.

To enhance the crystallinity, the film may be quenched on a heated casting drum that is maintained at a temperature above the glass transition temperature, but below the melt temperature. A higher quenching temperature allows the film to cool slowly and the crystallinity of the film to increase due to annealing. Preferably quenching occurs at a rate to not only maximize the crystallinity, but to maximize the size of the crystalline spherulites. Alternatively, the film may be quenched by feeding the extruded film through a nip of temperature-controlled rollers.

As an alternative, the film may be quenched in air or in a fluid such as water, which may be heated, to allow the film to cool more slowly and allow the crystallinity and spherulite size of the semicrystalline phase to be maximized. Air or water quenching may ensure the uniformity of the crystallinity and spherulite content across the thickness of the film.

Depending on the thickness of the extruded article, the temperature and the means by which the film is quenched, the morphology of the polymer may not be the same across the thickness of the article, i.e., the morphology of the two surfaces and/or the morphology of the surfaces and the matrix may be different. A surface in contact with the heated casting drum may be substantially crystalline, while the surface remote from the casting drum may have dissimilar morphology due to exposure to the ambient air where heat transfer is less efficient. Small differences in morphology do not normally prevent the formation of a fibrillated surface on either major surface on the film, but if fibrillated surfaces are desired on both surfaces of the article, it is preferred that the temperature of the casting drum be carefully controlled to ensure uniform crystallinity across the thickness of the article.

As another alternative, the film may be rapidly quenched to a temperature below the crystallization temperature and the crystallinity increased by stress induced crystallization; for example, by drawing at a draw ratio of at least 2:1. The drawing tension should be sufficient to produce alignment of the molecules and deformation of the spherulites by inducing the required plastic deformation above that produced by flow drawing.

The effect of casting temperature and cooling rate on crystallinity is known and reference may be made to S. Piccarolo et al., *Journal of Applied Polymer Science*, vol. 46, 625–634 (1992).

After casting (and drawing, if any), the polymer may be characterized by a relatively high crystallinity in the semicrystalline polymer phase and significant spherulite formation. The size and number of the spherulites is dependent of the casting conditions. The degree of crystallinity and presence of spherulite structures may be verified by, for example, x-ray diffraction and electron microscopy.

The thickness of the film will be chosen according to the desired end use and can be achieved by control of the process conditions. Cast films will typically have thicknesses of less than 100 mils (2.5 mm), and preferably between 30 and 70 mils (0.8 to 1.8 mm). However, depending on the characteristics desired for the resultant article, they may be cast at thicknesses outside of this range. Films are generally defined, for example, by the *Modern Plastic Encyclopedia*, as thin in relation to the width and length, and having a nominal thickness of no greater than about 0.25 mm. Materials of greater thickness are generally defined as sheets. As used herein, the term "film" shall also encompass sheets and it may also be understood that other configurations and profiles such as tubes may be provided with a fibrillated surface with equal facility using the process of this invention. In the present invention, cast films and well as blown films may be used to produce the fibrillated films of the invention. Further, the processes described herein can also be advantageously used on films that have been simultaneously biaxially stretched. Such stretching can be accomplished, for example, by the methods and apparatus disclosed in U.S. Pat. Nos. 4,330,499 (Aufsess et al.) and 4,595,738 (Huffnagel et al.), and more preferably by the methods and tenter apparatus disclosed in U.S. Pat. Nos. 4,675,582 (Hommes et al); 4,825,111 (Hommes et al.); 4,853,602 (Hommes et al.); 5,036,262 (Schonbach); 5,051,225 (Hommes et al.); and 5,072,493 (Hommes et al.), the disclosures of which are herein incorporated by reference.

For a film that is to be uniaxially oriented, it is preferred that the cast film is calendered after quenching. Calendering allows higher molecular orientation to be achieved by enabling subsequent higher draw ratios. In the absence of a calendering step, subsequent high draw ratios in the orienting step above the natural draw are generally not achievable without risking breakage. Calendering at the appropriate temperature can reduce the average crystallite size through shearing and cleaving of the entanglements, and may impose an aspect ratio on the spherulites (i.e. flatten in the transverse direction and elongate in the machine direction). It is preferred not to calender films that are to be subsequently biaxially oriented.

Calendering is preferably performed at or above the alpha crystallization temperature. The alpha crystallization temperature, $T\alpha c$, corresponds to the temperature at which crystallite subunits are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure. The calendering step has the effect of orienting the fibrils into the plane of the film from the original radially oriented sphere. The crystallites are cleaved due to the shear forces, which may be verified by wide-angle x-ray. Thus the individual fibrils are largely radial from the nucleating site, but lie in the same plane.

Figure 1:
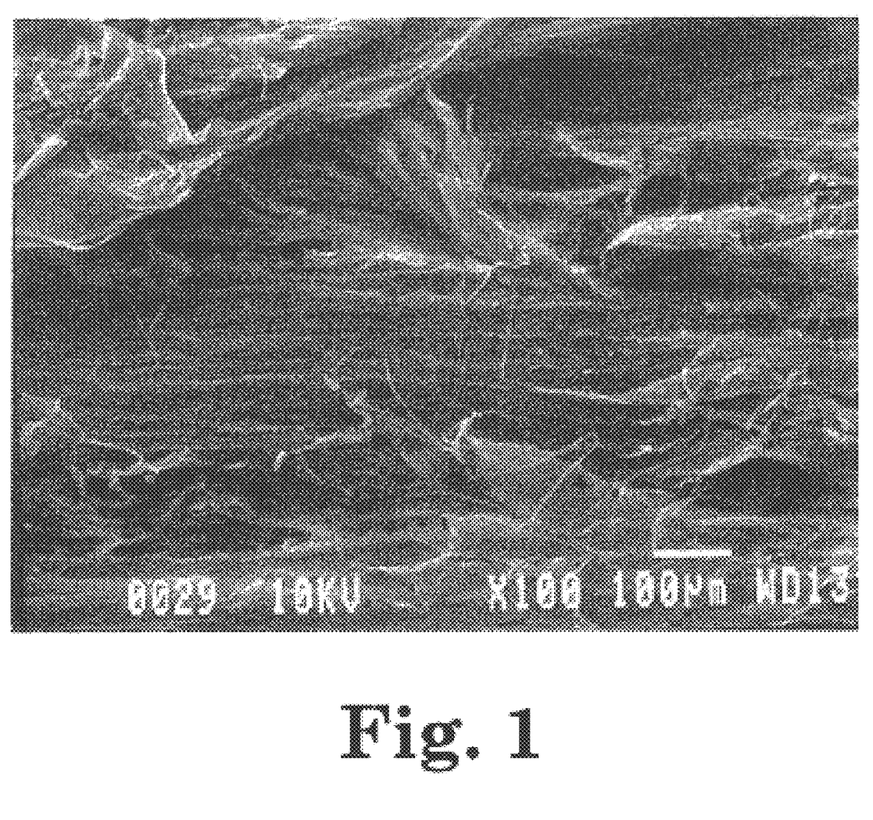
FIG. 1 is a digital image of a scanning electron micrograph (SEM) of a biaxially oriented, fibrillated film of Example 1.

In the orienting step, the film is stretched in the machine direction (X axis) and may be simultaneously or sequentially stretched in the transverse direction. When first stretched in the machine direction, the individual fibrils of the spherulites of the semicrystalline polymer are drawn substantially parallel to the machine direction (direction of orientation) of the film and in the plane of the film. The oriented fibrils can be visualized as having a rope-like appearance. Subsequent or further orientation of the film in the transverse direction results in reorientation of the fibrils , again in the plane of the film, with varying populations along the X,Y and intermediate axes, depending on the degree of orientation in the machine and transverse directions. See FIG. 1.

The stretching conditions are chosen to impart voids (in excess of 5% as measured by the change in density) to the film. The occurrence of a significant amount of voids will impart an translucent, opalescent or silvery appearance to the surface of the film due to light scattering from the defects. In contrast, film surfaces lacking significant voids have a transparent appearance. The presence of voids may be verified by small-angle x-ray or density measurement, or by microscopy. The appearance can serve as an empirical test of the suitability of an oriented film for the production of a fibrillated surface. It has been found that an oriented film lacking in significant amount of voids is not readily fibrillated, even though the film may be split longitudinally, as is characteristic of highly oriented polymer films having a fibrous morphology.

The quenched film may be biaxially oriented by stretching in mutually perpendicular directions at a temperature above the glass transition temperature of the semicrystalline polymer continuous phase. Generally, the film is stretched in one direction first and then in a second direction perpendicular to the first. However, stretching may be effected in both directions simultaneously if desired. In a typical process, the film is stretched first in the direction of extrusion over a set of rotating rollers or between two pairs of nip rollers and is then stretched in the direction transverse thereto by means of a tenter apparatus. Films may be stretched in each direction up to 2 to 10 times their original dimension in the direction of stretching.

The temperature of the first orientation (or stretching) affects film properties. Generally, the first orientation step is in the machine direction. Orientation temperature control may be achieved by controlling the temperature of heated rolls or by controlling the addition of radiant energy, e.g., by infrared lamps, as is known in the art. A combination of temperature control methods may be utilized.

Too low an orientation temperature may result in a film with an uneven appearance. Increasing the first orientation temperature may reduce the uneven stretching, giving the stretched film a more uniform appearance. The first orientation temperature also affects the amount of voiding that occurs during orientation. In the temperature range in which voiding occurs, the lower the orientation temperature, generally the greater the amount of voiding that occurs during orientation. As the first orientation temperature is raised, the degree of voiding decreases to the point of elimination. Electron micrographs of samples show that at temperatures at which no voiding occurs, the discrete phases domains often deform during stretching. This is in contrast to highly voided oriented samples; electron micrographs of highly voided samples show that the discrete phase domains in general retain their approximately shape during orientation.

A second orientation, or stretching, in a direction perpendicular to the first orientation may be desired. The temperature of such second orientation is generally similar to or higher than the temperature of the first orientation.

After the film has been stretched it may be further processed. For example, the film maybe annealed or heat-set by subjecting the film to a temperature sufficient to further crystallize the semicrystalline polymer component while restraining the film against retraction in both directions of stretching.

The final thickness of the film will be determined in part by the casting thickness, the degree of orientation, and any additional processing such as calendering. For most uses, the final thickness of the film prior to fibrillation will be 1 to 20 mils (.025 to 0.5 mm), preferably 3 to 10 mils (0.075 to 0.25 mm).

The oriented, voided film is then fibrillated by imparting sufficient fluid energy to the surface to release the fibers (or fibrous flakes) from the polymer matrix. Optionally, prior to fibrillation, the film may be subjected to a mechanical fibrillation step by conventional means to produce macroscopic fibers from the film. The conventional means of mechanical fibrillation uses a rotating drum or roller having cutting elements such as needles or teeth in contact with the moving film. The teeth may fully or partially penetrate the surface of the film to impart a fibrillated surface thereto. Other similar macrofibrillating treatments are known and include such mechanical actions as twisting, brushing (as with a porcupine roller), rubbing, for example with leather pads, and flexing. The fibers obtained by such conventional fibrillation processes are macroscopic in size, generally several hundreds of microns in cross section. Such macroscopic fibers are useful in a myriad of products such as particulate filters, as oil absorbing media, and as electrets.

The oriented film is fibrillated by imparting sufficient fluid energy thereto to impart a fibrillated surface, for example, by contacting a portion of at least one surface of the film with a high-pressure fluid. In the present fibrillation process, relatively greater amounts of energy are imparted to the film surface to release microfibers, relative to that of a conventional mechanical fibrillation process. Surprisingly, it has been found that less energy is required to fibrillate films prepared from the described two-component mixtures than that required for single component polymer films.

One method of fibrillating the surface of the film is by means of fluid jets. In this process one or more jets of a fine fluid stream impact the surface of the polymer film, which may be supported by a screen or moving belt, thereby releasing the fibers from the uniaxially oriented film, or the fibrous flakes from the biaxially oriented film. One or both surfaces of the film may be fibrillated. The degree of fibrillation is dependent on the exposure time of the film to the fluid jet, the pressure of the fluid jet, the cross-sectional area of the fluid jet, the fluid contact angle, the polymer properties, including composition of the polymer blend and, to a lesser extent, the fluid temperature. Different types and sizes of screens can be used to support the film.

Any type of liquid or gaseous fluid may be used. Liquid fluids may include water or organic solvents such as ethanol or methanol. Suitable gases such as nitrogen, air or carbon dioxide may be used, as well as mixtures of liquids and gases. Any such fluid is preferably non-swelling (i.e., is not absorbed by the polymer matrix), which would reduce the orientation and degree of crystallinity of the fibers or flakes. Preferably the fluid is water. The fluid temperature may be elevated, although suitable results may be obtained using ambient temperature fluids. For some polymers it may be advantageous to use temperatures below the glass transition temperature of the polymer, to facilitate fibrillation in materials that are elastomeric (such as polyurethane) or leathery at room temperature (such as polypropylene).

The pressure of the fluid should be sufficient to impart some degree of fibrillation to at least a portion of the film, and suitable conditions can vary widely depending on the fluid, the nature of the polymer, including the composition and morphology, configuration of the fluid jet, angle of impact and temperature. Typically, the fluid is water at room temperature and at pressures of at least 3400 kPa (500 psi), although lower pressure and longer exposure times may be used. Such fluid will generally impart a minimum of 5 watts or $10W/cm^2$ based on calculations assuming incompressibility of the fluid, a smooth surface and no losses due to friction.

The configuration of the fluid jets, i.e., the cross-sectional shape, may be nominally round, but other shapes may be employed as well. The jet or jets may comprise a slot which traverses a section or which traverses the width of the film. The jet(s) may be stationary, while the film is conveyed relative to the jet(s), the jet(s) may move relative to a stationary film, or both the film and jet may move relative to each other. For example, the film may be conveyed in the machine (longitudinal) direction by means of feed rollers while the jets move transverse to the web. Preferably, a plurality of jets is employed, while the film is conveyed through the fibrillation chamber by means of rollers, while a screen or scrim, which allows the fluid to drain from the microfibrillated surface, supports the film. The film may be fibrillated in a single pass, or alternatively the film may be fibrillated using multiple passes past the jets.

The jet(s) may be configured such that all or part of the film surface is fibrillated. Alternatively, the jets may be configured so that only selected areas of the film are fibrillated. Certain areas of the film may also be masked, using conventional masking agents to leave selected areas free from fibrillation. Likewise the process may be conducted so that the fibrillated surface penetrates only partially, or fully through the thickness of the starting film. If it is desired that the fibrillated surface extend through the thickness of the film, conditions may be selected so that the integrity of the article is maintained and the film is not severed into individual yarns or fibers.

Preferably the film is supported using a screen having a predetermined pattern and/or mesh size. It has been found the use of such support screens will impart a pattern, corresponding to the screen pattern on the fibrillated surface. When fibrillating a biaxially oriented film, and a mesh pattern support screen, the resulting fibrous flake surface bears a pattern resembling the warp and weft of a textile, rendering an article cloth-like in appearance. Screens may also be placed between the jet and the film for use as a mask, moving with the film during fibrillation. Masked portions of the film will not be fibrillated, preserving the original properties of the film in the masked areas. Patterned screens having an aspect ratio can impart a pattern to direct the tear of the film (for hand-tearable films and tapes) in a given direction. Useful support screens are available, for example, from Ron-Vik Inc., Minneapolis, Minn.

A hydroentangling machine, for example, can be employed to fibrillate one or both surfaces by exposing the fibrous material to the fluid jets. Hydroentangling machines are generally used to enhance the bulkiness of microfibers or yarns by using high-velocity water jets to wrap or knot individual microfibers in a web bonding process; a process also referred to as jet lacing or spunlacing. Alternatively a pressure water jet, with a swirling or oscillating head, may be used, which allows manual control of the impingement of the fluid jet.

The fibrillation may be conducted by immersing the sample in a high energy cavitating medium. One method of achieving this cavitation is by applying ultrasonic waves to the fluid. The rate of microfibrillation is dependent on the cavitation intensity. Ultrasonic systems can range from low acoustic amplitude, low energy ultrasonic cleaner baths, to focused low amplitude systems up to high amplitude, high intensity acoustic probe systems.

One method which comprises the application of ultrasonic energy involves using a probe system in a liquid medium in which the fibrous film is immersed. The horn (probe) should be at least partially immersed in the liquid. For a probe system, the fibrous film is exposed to ultrasonic vibration by positioning it between the oscillating horn and a perforated metal or screen mesh (other methods of positioning are also possible), in the medium. Advantageously, both major surfaces of the film are microfibrillated when using ultrasound. The depth of fibrillation in the fibrous material is dependent on the intensity of cavitation, amount of time that it spends in the cavitating medium and the properties of the fibrous material, including the composition of the polymer blend. The intensity of cavitation is a factor of many variables such as the applied amplitude and frequency of vibration, the liquid properties, fluid temperature and applied pressure and location in the cavitating medium. The intensity (power per unit area) is typically highest beneath the horn, but this may be affected by focusing of the sonic waves.

The method comprises positioning the film between the ultrasonic horn and a film support in a cavitation medium (typically water) held in a tank. The support serves to restrain the film from moving away from the horn due to the extreme cavitation that takes place in this region. The film can be supported by various means, such as a screen mesh, a rotating device that may be perforated or by adjustment of tensioning rollers which feed the film to the ultrasonic bath. Film tension against the horn can be alternatively used, but correct positioning provides better fibrillation efficiency. The distance between the opposing faces of the film and the horn and the screen is generally less than about 5 mm (0.2 inches). The distance from the film to the bottom of the tank can be adjusted to create a standing wave that can maximize cavitation power on the film, or alternatively other focusing techniques can be used. Other horn to film distances can also be used. The best results typically occur when the film is positioned near the horn or at ¼ wavelength distances from the horn, however this is dependent factors such as the shape of the fluid container and radiating surface used. Generally positioning the sample near the horn, or the first or second ¼ wavelength distance is preferred.

The ultrasonic pressure amplitude can be represented as:

$$P_0 = 2\pi B/\lambda = (2\pi/\lambda)\rho c^2 Y_{max}$$

The intensity can be represented as:

$$I = (P_0)^2/2\rho c$$

where $P_0$ =maximum (peak) acoustic pressure amplitude
I=acoustic intensity
B=bulk modulus of the medium
$\lambda$=wavelength in the medium
$Y_{max}$=peak acoustic amplitude
$\rho$=density of the medium, and
c=speed of the wave in the medium Ultrasonic cleaner bath systems typically can range from 1 to 10 watt/cm² while horn (probe) systems can reach 300 to 1000 watt/cm² or more. Generally, the power density levels (power per unit area, or intensity) for these systems may be determined by the power delivered divided by the surface area of the radiating surface. However, the actual intensity may be somewhat lower due to wave attenuation in the fluid. Conditions are chosen so as to provide acoustic cavitation. In general, higher amplitudes and/or applied pressures provide more cavitation in the medium. Generally, the higher the cavitation intensity, the faster the rate of microfiber production and the finer (smaller diameter) the microfibers that are produced. While not wishing to be bound by theory, it is believed that high pressure shock waves are produced by the collapse of the incipient cavitation bubbles, which impacts the film resulting in fibrillation.

The ultrasonic oscillation frequency is usually 20 to 500 kHz, preferably 20–200 kHz and more preferably 20–100 kHz. However, sonic frequencies can also be utilized without departing from the scope of this invention. The power density (power per unit area, or intensity) can range from 1 W/cm² to 1 kW/cm² or higher. In the present process it is preferred that the power density be 10 watt/cm² or more, and preferably 50 watt/cm² or more.

The gap between the film and the horn can be, but it is not limited to, 0.001 to 3.0 inches (0.03 to 76 mm), preferably 0.005 to 0.05 inches (0.13 to 1.3 mm). The temperature can range from 5 to 150° C., preferably 10 to 100° C., and more preferably from 20 to 60° C. A surfactant or other additive can be added to the cavitation medium or incorporated within the fibrous film. The treatment time depends on the initial morphology of the sample, film thickness and the cavitation intensity. This time can range from 1 millisecond to one hour, preferably from $\frac{1}{10}$ of a second to 15 minutes and most preferably from ½ second to 5 minutes.

In the present process the degree of fibrillation can be controlled to provide a low degree or high degree of fibrillation, whether from a uni- or biaxially oriented film. A low degree of fibrillation may be desired to enhance the surface area by partially exposing a minimum amount of fibers or flakes at the surface and thereby imparting a fibrous texture to the surface of the film. The enhanced surface area consequently enhances the bondability of the surface. Such articles are useful, for example as substrates for abrasive coatings and as receptive surfaces for printing, as hook and loop fasteners, as interlayer adhesives and as tape backings. Conversely, a high degree of fibrillation may be required to impart a highly fibrous texture to the surface to provide cloth-like films, insulating articles, filter articles or to provide for the subsequent harvesting of individual fibers or flakes (i.e., removal from the polymer matrix).

In either fibrillation process most of the fibers or flakes stay attached to the web due to incomplete release from the polymer matrix. Advantageously the fibrillated article, having fibers or flakes secured to a web, provides a convenient and safe means of handling, storing and transporting the fibrillated article. For many applications it is desirable to retain the fibers of flakes secured to the web. Integral fibers, for example, may be extremely useful in many filtering applications—the present fibrillated article provides a large filtering surface area due to the microscopic size of the fibers while the non-fibrillated surface of the film may serve as an integral support.

Optionally the microfibers or flakes may be harvested from the surface of the film by mechanical means such as with a porcupine roll, scraping and the like. Harvested microfibers generally retain their bulkiness (loft) due to the high modulus of the individual microfibers and, as such, are useful in many thermal insulation applications such as clothing. If necessary, loft may be improved by conventional means, such as those used to enhance the loft of blown microfibers, for example by the addition of staple fibers.

If desired, adjuvants such as antistats or colorants may be added to the polymer melt to impart a desired property to the fibers, fibrous flakes or films of the invention. Further, nucleating agents may be added to control the degree of crystallinity or, when using polypropylene, to increase the proportion of β-phase polypropylene in the crystalline film. A high proportion of β-phase is believed to render the crystalline film more readily microfibrillated. β-phase nucleating agents are known and are described, for example, in Jones, et al., *Makromol. Chem.*, vol. 75, 134–158 (1964) and J. Karger-Kocsis, *Polypropylene: Structure, Blends and Composites*, vol. 1, 130–131(1994). One such beta nucleating agent is N',N',-dicyclohexyl-2,6-napthalene dicarboxamide, available as NJ-Star NU-100™ from New Japan Chemical Co. Chuo-ku, Osaka. Japan.

The present invention also provides a multilayer film comprising at least one film layer having a fibrillated film layer of the invention and at least one additional porous or non-porous layer. In such a multilayer construction, the fibrillated film layer may be an exterior layer or an interior layer. The additional layers of a multilayer article may include non-woven fabrics scrims or webs, woven fabrics or scrims, porous film, and non-porous film. Such materials may be bonded or laminated to the film of the invention by, for example, pressing the film and the web together in a nip between a smooth roll and a second roll (preferably having an embossing pattern on its surface) and heated sufficiently to soften the material facing the metal roll. Other bonding means such as are known in the art may also be used. Alternatively materials may be laminated by means of adhesives such as pressure-sensitive or hot-melt adhesives.

Surprisingly, in such multilayer constructions, it is not necessary to contact the blend film layer in order to effect fibrillation. When bonded to an additional film or scrim layer, the high pressure fluid may also effect fibrillation by impinging on the additional film layer.

Multilayer films comprising at least one fibrillated film layer of the invention may be prepared using a variety of equipment and a number of melt-processing techniques (typically, extrusion techniques) well known in the art. Such equipment and techniques are disclosed, for example, in U.S. Pat. Nos. 3,565,985 (Schrenk et al.), 5,427,842 (Bland et al.), 5,589,122 (Leonard et al.), 5,599,602 (Leonard et al.), and 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded.

For example, one technique for manufacturing multilayer films of the present invention can use a coextrusion technique, such as that described in U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The particular extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, CT), Black Clawson Co. (Fulton, NY), Berstorff Corp. (KY), Farrel Corp. (CT), and Moriyama Mfr. Works, Ltd. (Osaka, Japan).

Figure 6:
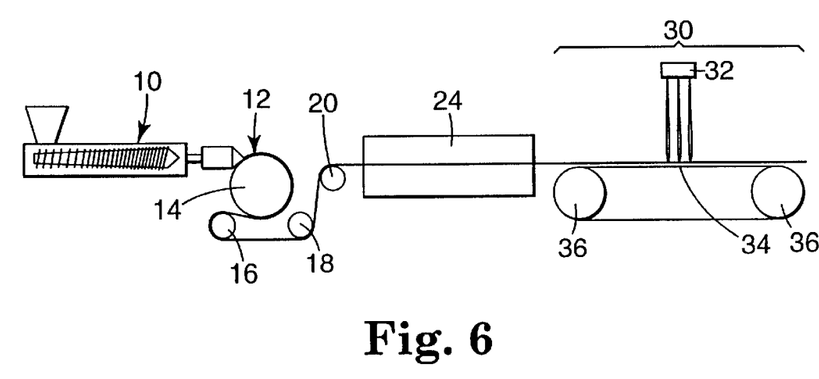
FIG. 6 is a schematic of an embodiment of the process of the invention.

Referring to FIG. 6, the extruder (10) supplies a molten, immiscible polymer mixture (comprising the semicrystalline polymer component and the void initiating component) via an extruder nip or orifice having a predetermined profile to produce a semi-molten film (12). The film may be cast onto casting drum (14), having a temperature control means for quenching the film at the desired temperature and maximizing the crystallinity semicrystalline component(s) of the film. The casting drum may be heated to a temperature above the glass temperature or may be maintained at a temperature suitable for cold quenching. If cold quenching is desired, the cast film may be immediately stretched by means of a length orienting device (not shown). The casting wheel for example may be solid or hollow and heated by means of a circulating fluid, resistance heaters, air impingement or heat lamps.

For films to be subsequently uniaxially oriented, the cast film may be fed by means of tensioning guide rollers (16), (18) and (20) to calendering apparatus (not shown) wherein the profile of the film may be reduced to impart a degree of orientation thereto. Calendering apparatus (not shown) may be temperature controlled so as to impose the desire deformation and maximize cleavage of the crystallites. The calendered film is fed to an orienting apparatus (24) by means of feed rollers (not shown) whereby the film is stretched (uniaxially or biaxially) to impart a voided morphology to the film. The orienting apparatus may comprise a plurality of rollers that provide tension in the machine direction and may include a tenter apparatus for stretching in the transverse direction. Generally, the downweb rollers rotate at rates faster than the upweb rollers to maintain the desired tension. Preferably the rollers are maintained at temperatures optimum for orienting a particular semicrystalline polymer component More preferably the rollers are maintained in a sequence of decreasing temperature so that highest possible draw rates may be achieved. The orientation may be uniaxial or may include a tentering frame for biaxial orientation. After orienting, the film is cooled on a cooling wheel (not shown) and removed form the apparatus by take-off rollers (not shown).

Preferably, the calendering apparatus, if used, and the length orienting apparatus are so disposed to provide a minimum gap between the nip rollers of the calendering apparatus and the idler rollers of the orienting apparatus to avoid relaxation of the calendered film prior to length orientation.

The highly oriented film may be fed to the fibrillation apparatus (30) as shown in the figure, or may be stored for later use. Preferably the film is fed directly to the microfibrillation apparatus (30). Fibrillation of the film may optionally include a macrofibrillation step whereby the film is subjected to a mechanical fibrillation by means of a porcupine roller (not shown) to expose a greater surface area of the fiber or fiber bundles. In the present process it is generally not necessary to mechanically macrofibrillate the film, although subsequent microfibrillation may be enhanced by surface roughening.

Fibrillation apparatus (30) may comprise one or more fluid jets (32) which impact the film with sufficient fluid energy to fibrillate the surface, exposing fibers from uniaxially oriented films, and fibrous flakes from biaxially oriented films. The film may be conveyed on support belt (34) driven by rollers (36). The belt is typically in the form of a screen that can provide mechanical support and allow the fluid to drain.

Alternatively, the apparatus may comprise an ultrasonic horn immersed in a cavitation fluid as previously described. The film is conveyed by guide rollers (not shown) which position the film against a support screen at a predetermined distance from the ultrasonic horn.

The present invention provides films with a high surface area which enhances the performance when used as adsorbents, such as in oil-adsorbent mats or batts used in the clean up of oil spills and slicks. Other potential uses include: strong reinforcing fibers in the manufacture of composite materials to enhance interfacial bonding, multilayer constructions where the wicking effect of the fibrous surface is used to enhance multilayer adhesion or integrity, and in fastener applications. The fibers are especially useful as a reinforcing agent in concrete, due to the high surface area (which aids bonding), high tensile strength (which prevents crack formation and migration), rectangular cross-section and low elasticity. Fibrillated films may also be useful as tape backings or straps to yield an extremely strong tape due to the high modulus and tensile strength of the fibrillated films. When used as a tape backing, the fibrillated film can be coated with any conventional hot melt, solvent coated, or like adhesive suitable for application to films. Either the fibrillated surfaces or non-fibrillated surface may be coated, or both surfaces may be coated. Advantageously, when using a biaxially oriented fibrillated film of the present invention, the adhesive tapes prepared therefrom may be easily torn in either the longitudinal or transverse direction.

Many types of adhesives can be used. The adhesive can include hot melt-coated formulations, transfer-coated formulations, solvent-coated formulations, water-based, and latex formulations, as well as laminating, thermally-activated, and water-activated adhesives. These adhesives can be applied by conventional techniques, such as solvent coating by methods such as reverse roll, knife-over-roll, gravure, wire wound rod, floating knife or air knife, hot-melt coating such as; by slot orifice coaters, roll coaters or extrusion coaters, at appropriate coating weights.

Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

Useful adhesives according to the present invention can be pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

When a pressure sensitive adhesive is coated onto one side of the backing and a release coating (a low adhesion backsize (LAB) coating) is optionally coated on the opposite side to allow the resultant tape to unwind from itself when wound in a roll or release when in a pad form.

When utilized, the release coating composition should be compatible with the adhesive composition and not degrade the adhesive properties of the tape, such as by being transferred to the adhesive composition.

Release coating compositions for the LAB layer of tapes may include silicone, alkyl, or fluorochemical constituents, or combinations as the release imparting component. Useful release coating compositions for the invention include silicone containing polymers, such as silicone polyurethanes, silicone polyureas and silicone polyurethane/ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202, 190, and 4,728,571. Other useful release coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate) such as those described in U.S. Pat. Nos. 3,502,497 and 4,241,198, where the alkyl side chain includes from about 16 to 22 carbon atoms.

These release polymers can be blended with each other and with thermosetting resins or thermoplastic film forming polymers to form the release coating composition. In addition, other additives may be used in the release coating compositions such as fillers, pigments, wetting agents, viscosity modifiers, stabilizers, anti-oxidants, and cross-linking agents.

Numerous other layers can be added to the tape, such as primers to increase adhesive layer adhesion to the backing layer. Also, the release properties of the backing can be modified such that the backing and the adhesive cooperate to achieve desired unwind characteristics. The release properties of the backing can be modified by applying a low surface energy composition, priming, corona discharge, flame treatment, roughening, etching, and combinations.

Figure 3:
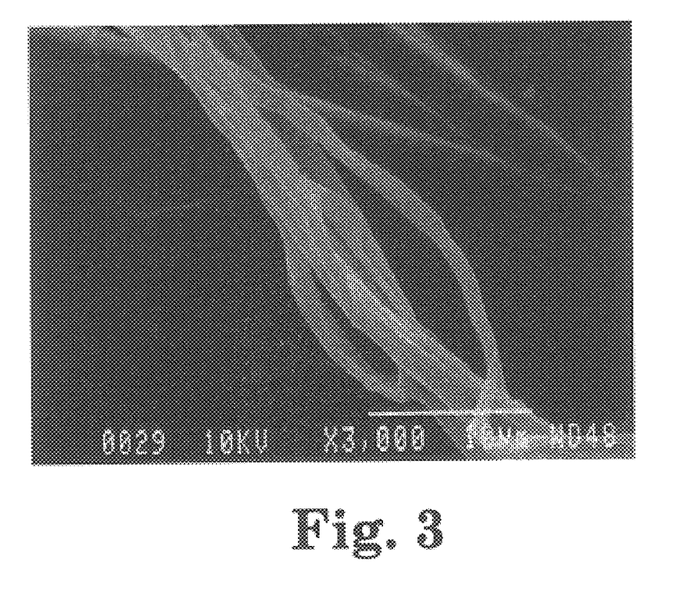
FIG. 3 is a digital image of a scanning electron micrograph (SEM) of a uniaxially oriented, fibrillated film of Example 9.
Figure 4:
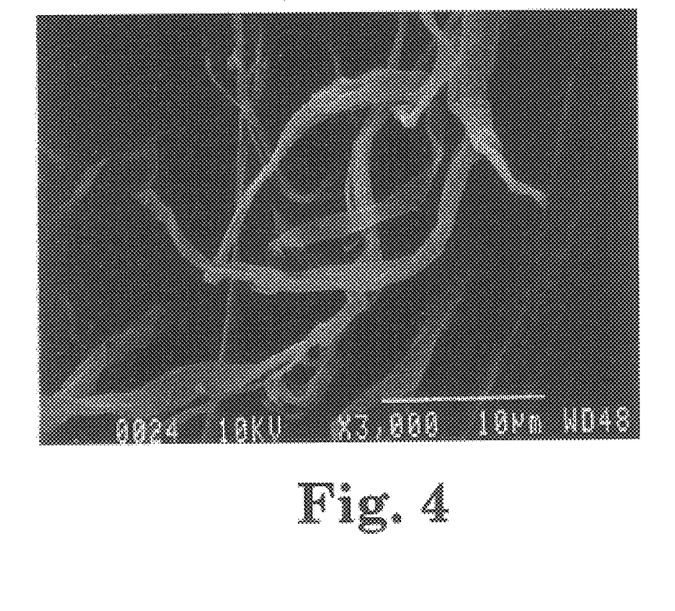
FIG. 4 is a digital image of a scanning electron micrograph (SEM) of a uniaxially oriented, fibrillated film of Example 10.

The fibers obtained from a uniaxially oriented film are several orders of magnitude smaller in diameter than the fibers obtained by mechanical means (such as with a porcupine roller) ranging in size from less than 0.01 microns to 20 microns. Surprisingly, the fibers thus obtained are rectangular in cross section, having a cross sectional aspect ratio (transverse width to thickness) ranging from of about 1.5:1 to about 20:1 as can be seen in FIGS. 3 and 4 Further, the sides of the rectangular shaped microfibers are not smooth, but have a scalloped appearance in cross section. Atomic force microscopy reveals that the fibers of the present invention are bundles of individual or unitary fibrils, which in aggregate form the rectangular or ribbon-shaped microfibers. Thus the surface area exceeds that which may be expected from smooth fibers, and such surface enhances bonding in matrices such as concrete and thermoset plastics.

TEST PROCEDURES

Tensile Modulus, Tensile Strength

Tensile modulus and tensile strength were measured using an Instron tensile testing machine, Model 1122 (Instron Corp., Canton, Mass.) equipped with a 5 KN load cell, model 2511-105 (full scale range assembly A40–41A). A cross-head speed of 0.3 m/min and a 5 cm gap were used for all testing. Free-standing samples measuring 12.7 cm×1.27 cm were used. Tests were conducted at 23° C. unless otherwise specified.

Dynamic Mechanical Analysis (DMA)

Freestanding strips of each sample were clamped in the jaws of a Seiko Instruments DMA 200 Rheometer (Seiko Instruments, Torrance, Calif.) equipped with a tensile sample fixture. The samples were tested from −60 to 200° C. at 2° C./minute and 1 Hz. Separation between the jaws was 20 mm.

Oil Adsorption

Microfibrillated samples were weighed, then immersed in MP404™ lubricating oil (Henkel Surface Technologies, Madison Heights, Mich.) or Castrol Hypoy™ gear oil (Castrol Industrial North America Inc., Downers Grove, Ill.) for 60 seconds, then drained on a screen for one hour and re-weighed. All steps were performed at 23° C. Results were recorded as grams of oil adsorbed per gram of adsorbing material.

Elmendorf Paper Tear Resistance

Tear resistance of microfibrillated samples was measured essentially according to ASTM D1922-94a and TAPPI Method T414 om-88 using an Model 60-1200 ProTear™ Mechanical Tearing Tester (Elmendorf-type, Thwing-Albert Instrument Co., Philadelphia, Pa.). Samples were 63 mm×51 mm, with measurements carried out in the machine-direction and cross-web direction as indicated. Results were recorded as grams(force) per 16 plies of sample.

EXAMPLES

Example 1
Water-Jet Microfibrillation of Biaxially-Oriented Blended PP/PBT Film

A heterogeneous single layer film was prepared by extrusion of a 75:25 w/w ratio of polypropylene (PP, FINA 3374X, Fina, Inc., Dallas, Tex.) and poly(butylene terephthalate) (PBT, Valox™ 315, General Electric Plastics, Pittsfield, Mass.) from a 4.4 cm diameter single screw extruder operating at 77 rpm using an Acrison feeder (Acrison Inc., Moonachie, N.J.) for the PBT and the main hopper for the PP. PBT was dried at about 71° C. for 3 hours prior to blending. Zone temperatures in the extruder were between 230° C. and 260° C., while the filter, neck-tube and die were maintained at 249° C. The extruded web was cast onto a casting wheel held at 107° C. rotating at 1.5 m/min, using air-jets to hold the web to the wheel.

The film was sequentially oriented in the machine direction (MD) followed by transverse direction (TD). Initial MD draw was accomplished using a multi-roll length orienter using a series of six 15 cm diameter preheat rolls (115° C.) arranged such that each side of the film came in contact with three rolls (Brückner Maschinenbau GmbH, Siegsdorf, Germany), followed by slight stretching in a tenter as the TD draw occurred, followed by additional drawing in a retensilizer, to effect an MD draw ratio of 5:1 at 130° C. and a TD draw ratio of 6:1 at 160° C. Final film thickness was approximately 0.125 mm. The oriented film had a silvery appearance, indicating the presence of voids.

A 1.27 cm wide sample of the oriented film was passed once on each side at 1.2 m/min through a Model 2303 hydroentangling machine (Honeycomb Systems Inc., Bridgeport, Me.) equipped with a 61 cm die having 0.13 mm diameter holes spaced 0.39 mm apart (pitch) at 1.2 m/min. Deionized water (23° C.) at a pressure of from 8280 KPa to 9600 KPa was used, over a relatively open support screen having 1.25 mm×1.25 mm openings, 0.46 mm wire diameter and 1.2 mm screen thickness. After fibrillation, the films were approximately 0.28 mm thick. Properties of the resulting cloth-like films are shown in Table 1.

TABLE 1

| Sample No. | Orientation | Modulus, MPa | Tensile Strength, MPa | Max. Load at Break, N | Strain at Break, % |
| --- | --- | --- | --- | --- | --- |
| Control | MD | 598 | 46.2 | 2.30 | 75.5 |
| Control | TD | 791 | 62.4 | 3.13 | 22.4 |
| Ex. 1 | MD | 242 | 17.3 | 0.61 | 15.5 |
| Ex. 1 | TD | 222 | 15.2 | 0.52 | 10.7 |

The data of Table 1 show that microfibrillation generally decreases the physical properties of biaxially oriented films. A digital image of the fibrillated film of Example 1, revealing the fibrous flakes, can be seen in FIG. 1.

Example 2
Highly Microfibrillated Biaxially-Oriented Film

The biaxially-oriented film of Example 1 was subjected to further water-jet microfibrillation by passing the sample under the water jet a second time on each side. The resulting fibrillated web exhibited MP404 oil absorption of 27.0 g/g.

Example 3
Water-Jet Microfibrillation of Biaxially-Oriented Blended PP/PBT Film

A cast film was prepared essentially as described in Example 1 from a 95:5 wt % blend of polypropylene (FINA 3374X) and poly(butylene terephthalate) (Valox 315). The film was oriented at a 6×MD draw ratio in a multi-roll length orienter at 115° C. and retensilizer at 130° C. and a 6×TD draw in a tenter at 165° C. Final thickness of the oriented film was 0.04 mm. Water-jet fibrillation, as described in Example 1 using a 10,350 KPa waterjet and a line speed of 51 cm/min, produced a fibrillated film of 0.23 mm thickness. Properties of the film are shown in Table 2.

TABLE 2

| Sample No. | Orientation | Modulus, MPa | Tensile Strength, MPa | Max. Load at Break, N | Strain at Break, % | Elmendorf Tear, g/16 ply |
|---|---|---|---|---|---|---|
| Control | MD | 648 | 112 | — | 60.1 | |
| Control | TD | 666 | 91.9 | — | 62.7 | |
| Ex. 3 | MD | 219 | 15.3 | 1.04 | 13.8 | — |
| Ex. 3 | TD | | | | | 54 |

Example 4
Water-Jet Microfibrillation of Biaxially-Oriented Blended PP/PBT Film

A cast film was prepared essentially as described in Example 1 from a 95:5 blend of polypropylene (FINA 3374X) and poly(butylene terephthalate) (Valox 315). The film was oriented at a 5×MD draw ratio in a multi-roll length orienter at 120° C. followed by a 8×TD draw in the tenter at 168° C. In contrast to Examples 1 and 3, neither the tenter nor retensilizer were used for additional length orientation. After orientation, the film was 0.04 mm thick.

The oriented film was subjected to fibrillation in a hydroentangler as described in Example 1 under 10350 KPa water pressure at 0.6 m/min. The resulting film was 0.23 mm thick. Properties of the film before and after fibrillation are shown in Table 3.

TABLE 3

| Sample No. | Orientation | Modulus, MPa | Tensile Strength, MPa | Max. Load at Break, N | Strain at Break, % | Elmendorf Tear, g/16 ply |
|---|---|---|---|---|---|---|
| Control | MD | 1124 | 136 | — | 102 | 24 |
| Control | TD | 1142 | 157 | — | 39 | 24 |
| Ex. 4 | MD | 95 | 7.7 | — | 21 | 24 |
| Ex. 4 | TD | 104 | 5.8 | — | 7 | 48 |

Example 5
Water-Jet Microfibrillation of Biaxially-Oriented Blended PP/PBT Film

A proprietary biaxially-oriented blended polypropylene film, LABEL-LYTE™ 150 LL 302 (Mobil Chemical Co., Fairfax, Va.), approximately 0.07 mm thick, was subjected to water-jet microfibrillation as described in Example 1. After fibrillation, the film was approximately 0.8 mm thick. Properties of the film before and after fibrillation are shown in Table 4.

TABLE 4

| Sample No. | Orientation | Modulus, MPa | Tensile Strength, MPa | Max. Load at Break, N | Strain at Break, % | Elmendorf Tear, g/16 ply |
|---|---|---|---|---|---|---|
| Control | MD | 677 | 79.6 | — | 154 | |
| Control | TD | 1287 | 150 | — | 20.4 | |
| Ex. 5 | MD | 466 | 58.7 | 1.77 | 101.9 | — |
| Ex. 5 | TD | | | | | Near fail |

Example 6
Fibrillation of a Biaxially-Oriented Coextruded (Bilayer) Film

A two-layer film was cast by coextrusion and oriented using conventional film orientation techniques. The first layer was a blend of about 28% by weight of Fina 3230™ polypropylene (Fina Inc., Dallas, Tex.) having a melt flow index of 1.6 (determined according to ASTM D-1238, Condition "L") and about 72% by weight dried, extrusion grade polyethylene terephthalate (PET, 3M, St. Paul, Minn.), with an intrinsic viscosity (I.V.) of about 0.58 dL/g. This blend was fed to the input of a 20 cm extruder using a volumetric feeder to control the rate of addition of the polypropylene. The total feed rate of the first (blend) layer was about 585 kg/hr. The second layer was dried, extrusion grade polyethylene terephthalate (PET), with an intrinsic viscosity (I.V.) of about 0.58 dL/g, fed to the input of a 9 cm extruder. The total feed rate of the second (PET) layer was about 166 kg/hr. A filter for particulate control and a gear pump for flow rate control were installed after the extruder gate for both of the extruders. The first and second layers were combined using a 2-layer Cloeren feedblock attached to a 94 cm wide sheeting die with a die gap of about 0.14 cm. The sheet formed by the die was cast onto a temperature-controlled casting wheel maintained at a temperature of about 16° C. The sheet was cast such that the second (PET) layer was against the casting wheel. The cast sheet was held in place by electrostatic pinning. A finished film was then made using conventional polyester biaxial orientation equipment to stretch the film in the machine direction (MD) about 3.2 times at a temperature of about 83° C. and then to stretch the film in the transverse direction (TD) about 3.7 times at a temperature of about 103° C. The stretched film was then subjected to a heat set temperature of about 252° C. while the film was restrained. The thickness of the finished film was about 0.13 mm.

Electron microscopy of the cast web revealed that the polypropylene in the first (blend) layer formed discrete domains in a continuous PET matrix in the first (blend) layer. Under the described processing conditions, voids formed at the interface between the discrete polypropylene domains and the continuous PET matrix in the first (blend) layer during film orientation. The finished film density was an indicator of the amount of voiding present in the first (blend) layer. The density of the finished (oriented) film was about 0.83 g/cm$^3$.

Figure 5:
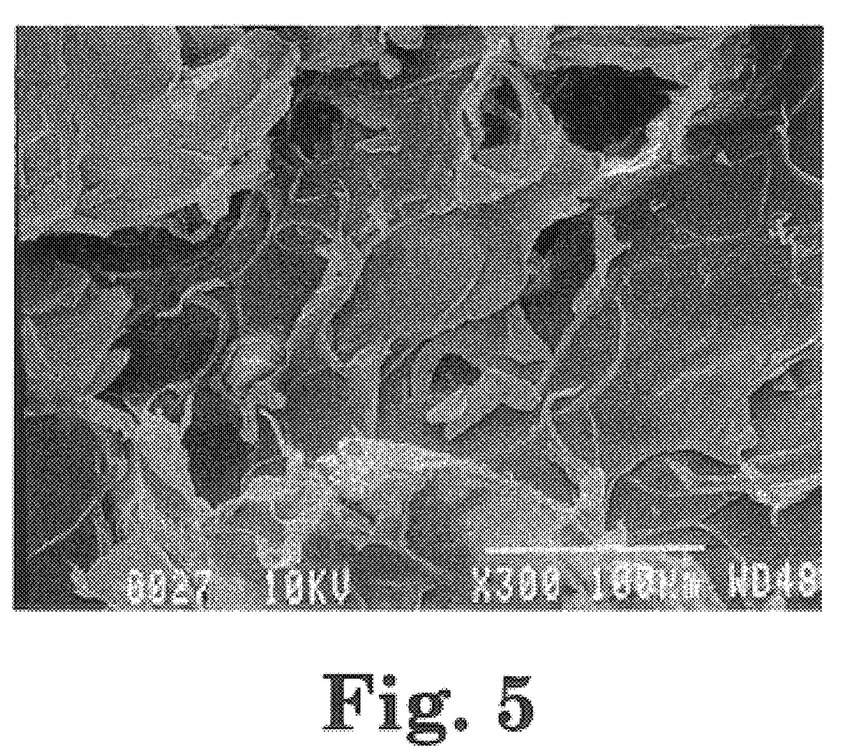
FIG. 5 is a digital image of a scanning electron micrograph (SEM) of a biaxially oriented, two layer fibrillated film of Example 6.

Fibrillation of the film sample was carried out as described in Example 1, with the polymer blend side toward the water-jets. A very smooth fiber structure was obtained, whereas the PET layer was unaffected. . A digital image of the fibrillated film of Example 6 can be seen in FIG. 5. The image reveals a surface having a paper-like appearance where the continuous phase is polyethylene terephthalate and the discontinuous phases is polypropylene.

Example 7
Preparation and Fibrillation of a Filled Bilayer Film.

A two-layer film was cast by coextrusion and oriented using conventional film orientation techniques. The first layer was a 1:1 blend of 20 wt % talc filled polypropylene (RTP™ 128, available from RTP Company, Winona, Minn.) and unfilled polypropylene (film grade isotactic polypropylene with a melt index of 2.5 dg/min (2.16 kg/230° C., available as Escorene 4792 E-1 ™, available from Exxon Chemical, Houston, Tex.). The materials were hand mixed, added to a hopper and extruded at 245° C. by means of a 1 ¼" (3.18 cm) diameter single screw extruder (C. W. Brabender, South Hackensack, N.J.). The second stream was Escorene 4792 E-1 extruded at 245° C. by means of 1 ¾" (4.45 cm) single screw extruder (HPM Co., Mount Giliad, Ohio). The two streams converged in a Y adapter, fed to a 7"

wide (17.8 cm) single manifold sheeting die, and cast onto a 45 cm diameter casting wheel maintained at 50° C. at a speed of 1.88 m/minute, such that the second stream was against the casting wheel. The cast sheet was pinned to the casting wheel using an air knife, then further quenched by passing the two layer film through a water cascade and bath maintained at ambient temperature.

The film was sequentially oriented in the machine direction (MD) followed by transverse direction (TD). Prior to the MD draw, the cast sheet was preheated by passing the cast sheet over six 15cm diameter preheat rolls maintained at 125° C. at a speed of 1.88 m/minute. The rolls were arranged such that each side of the cast sheet came in contact with three rolls (Brückner Maschinenbau GmbH, Siegsdorf, Germany). The cast sheet is oriented in the MD by passing the cast sheet through two 7 cm diameter rolls maintained at a temperature of 125° C. and separated by a gap of 1 cm. The first roll was operated at a speed of 1.88 m/minute while the second roll was operated at a speed of 11 m/minute so as to effect an MD draw ratio of 5:1. The MD oriented film entered a tenter frame (Brückner Maschinenbau GmbH, Siegsdorf, Germany). The MD oriented film was preheated at 169–172° C. and stretched at 170° C. in the TD by means of diverging rails to a TD draw ratio of 9:1. Final film thickness was approximately 0.03 mm (1.2 mil) including talc filled layer of approximately 0.0031 mm (.12 mil). The oriented film had a silvery appearance, indicating the presence of voids.

A 1.27 cm wide sample of the oriented film was passed once on each side at 1.2 m/min through a Model 2303 hydroentangling machine (Honeycomb Systems Inc., Bridgeport, Me.) equipped with a 61 cm die having 0.13 mm diameter holes spaced 0.39 mm apart (pitch) at 1.2 m/min. Deionized water (23° C.) at a pressure of from 5516 KPa to 10,343 KPa (800 to 1500 psi) was used, over a relatively open support screen having 1.25 mm×1.25 mm openings. Pressures above about 7500 kPa were especially effective for this sample. After fibrillation, the films were approximately 0.28 mm thick.

Example 8
Preparation and Fibrillation of 80:20 PP:PBT film

A cast film was prepared essentially as described in Example 1 from a 80:20 blend of polypropylene (FINA 3374X) and poly(butylene terephthalate) (Valox 315). Zone temperatures in the extruder were 229-238-257 and 260° C., while the neck-tube and die were maintained at 260° C. No filter was used. The extruded web was cast onto a casting wheel held at 107° C. rotating at 0.89 m/min, using air-jets to hold the web to the wheel. The film was oriented at a 5:1 MD draw ratio in a multi-roll length orienter at 130° C., then at a 9:1 TD draw ratio in a tenter at 170° C. (final zone 145° C.). Finish caliper of the film was 0.098 mm.

Figure 2:
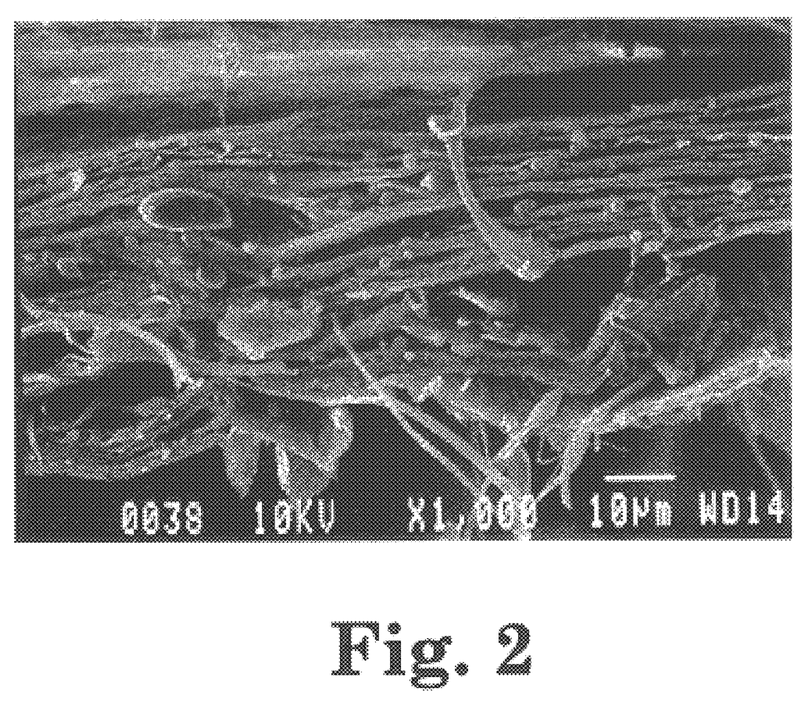
FIG. 2 is a digital image of a scanning electron micrograph (SEM) of a biaxially oriented, fibrillated film of Example 8.

The film was fibrillated using a single-head water jet having 60 micrometer diameter orifices at 0.47 mm pitch operating at 20 MPa water pressure. Film speed under the fibrillator was 3 m/min. A digital image of a cross-section of the fibrillated film of Example 8 can be seen in FIG. 2. The discontinuous phase of polybutylene terephthalate can be seen as small spherical domains within the continuous phases of polypropylene.

Example 9
Preparation and Fibrillation of a Uniaxially Oriented 95:5 PP:PBT Film A cast film was prepared essentially as described in Example 1 from a 95:5 blend of polypropylene (FINA 3374X) and poly(butylene terephthalate) (Valox 315). The film was oriented in a multi-roll length orienter at 115° C., then in a tenter at 130° C., then in a retensilizer at 130° C. such that the final MD stretch was 11.5×. No transverse orientation was imparted to the sample. The resulting film was subjected to microfibrillation with water jets using a 10 cm three orifice neutral balanced swirling head attached to a Jet Edge water cutting table equipped with three axis controls that was adjusted to produce $7.6 \times 10^{-3}$ m³ (2 gallons) of water at 248 MPa (36,000 psi) (Jet Edge, Minneapolis, Minn.). The actual water pressure was 103.5 MPa (15,000 psi) at a film speed of 1.3 m/min past the stationary swirling head. A digital image of the uniaxially stretched, fibrillated film of Example 9 can be seen in FIG. 3.

Example 10
Preparation and Fibrillation of a Uniaxially Oriented 70:30 PP:PE Blend A heterogeneous single layer film was prepared by extrusion of a 70:30 w/w ratio of polypropylene (PP, FINA 3374X, Fina, Inc., Dallas, Tex.) and polyethylene (HDPE, LB832000™, Equistar Chemicals, LP, Houston, Tex.) from a 4.4 cm diameter single screw extruder operating at 77 rpm using an Acrison feeder (Acrison Inc., Moonachie, N.J.) for the HDPE and the main hopper for the PP. Zone temperatures in the extruder were 235-241-246-249 and 257° C., while the filter, neck-tube and die were maintained at 254° C. The extruded web was cast onto a casting wheel held at 93° C. rotating at 0.87 m/min, using air-jets to hold the web to the wheel.

The cast film was oriented in the machine direction using the multi-roll length orienter described in Example 1 (6:1 draw at 90° C.), followed by slight draw in a tenter (1.2:1; all zones at 130° C., without cross-web draw) and 2:1 draw in a retensilizer at 130° C., such that the total draw realized for the sample was 14.4:1.

The oriented film was fibrillated using a hydroentangler as described in Example 1. A digital image of the fibrillated film of Example 10 can be seen in FIG. 4. As can be seen in the Figure, the fibrillation extends substantially through the film thickness.

Example 11
Preparation of Adhesive Tape

An adhesive tape was prepared as follows. The tape backing was the biaxially oriented fibrillated film described in example 4. The surface energy of the film was modified to promote pressure sensitive adhesive anchorage by corona treatment using a model BD-20 High Frequency Generator laboratory scale corona treater from Electro-Technic Products Inc., 4642 North Ravenswood, Chicago, Ill., 60640. The corona treater was passed by hand over the film surface at a rate of one inch per second, with an approximate gap of ⅛ inch between the treater head and the film surface. Corona treatment was applied only to the non-fibrillated side of the film.

A block copolymer pressure sensitive adhesive formulation was prepared as follows. Kraton D1107 elastomer (42.5 grams, available from Shell Chemical Company) 39.0 grams of Escorez 1310 tackifier (available from Exxon Chemical, Houston, Tex.), and 18.5 grams of Zonarez A-25 plasticizer (available from Arizona Chemical, Cleveland, Ohio) were dissolved in 100 grams of toluene yielding a 50% solids solution. Dissolution was aided by shaking the sealed container on a shaker (Eberbach Corp, Ann Arbor, Mich.) on low speed for 16 hours.

The pressure sensitive adhesive formulation was applied on the corona treated surface of the film. A five inch wide (12.7 cm) by three foot long (0.1 m) sample of film was coated using a six inch wide (15,2 cm) notch bar coater set at a coating gap of 3.0 mils (7.6 mm). This translates into an approximate 1.5 mil (3.8 mm) wet pressure sensitive adhesive coating thickness. After coating, the film/adhesive sample was anchored to a board and dried in a forced air oven at 160° F. (71° C.) for five minutes. The dry pressure sensitive adhesive coating was approximately 0.75 mils (1.9 mm) thick.

A razor knife was used to cut two-inch (5 cm) wide tape strips out of the master sheet. The tape samples have a cloth-like appearance, which is a particular requirement for a duct tape backing. The fibrillation process imparts topography in the film to appear as though it is comprised of warp and fill yarns. The tape has bidirectional tear properties such that it will tear by hand transversely and longitudinally. Tape samples were applied to irregular surfaces (contoured, rounded comers) which conform well to those substrates.

We claim:

1. An oriented film comprising a melt-processed immiscible mixture comprising a semicrystalline polymer component and a void initiating component, said film having at least one microfibrillated surface, wherein said surface is microfibrillated by imparting sufficient fluid energy to at least one surface of said film.

2. The film of claim 1 wherein said film has two microfibrillated surfaces.

3. A multilayer film wherein at least one layer comprises the film of claim 1 and at least one additional layer.

4. The multilayer film of claim 3 wherein said additional layer is selected from non-woven fabrics scrims or webs, woven fabrics or scrims, porous films, and non-porous films.

5. The film of claim 1 wherein said void initiating component is a inorganic void initiating component selected from the group consisting of solid or hollow glass, ceramic or metal particles, microspheres or beads; zeolite particles; metal oxides; metal, alkali- or alkaline earth carbonates or sulfates; kaolin, talc, and carbon black.

6. The film of claim 1 wherein said void initiating component is a polymer which forms an immiscible blend with said semicrystalline polymer component.

7. The film of claim 1 wherein said first semicrystalline polymer is selected from the group of high and low density polyethylene, polypropylene, polyoxymethylene, poly(vinylidine fluoride), poly(methyl pentene), poly(ethylenechlorotrifluoroethylene), poly(vinyl alcohol), poly(vinyl fluoride), poly(ethylene oxide), poly(ethylene terephthalate), poly(butylene terephthalate), nylon 6, nylon 66, polybutene, and thermotropic liquid crystal polymers.

8. The film of claim 6 wherein said polymer blend is selected from the group of polypropylene and polybutylene terephthalate, polypropylene and polyethylene terephthalate, polypropylene and polystyrene, polypropylene and high density polyethylene, polypropylene and low density polyethylene, polypropylene and polycarbonate, polypropylene and polymethlypentene; and polypropylene and nylon.

9. The microfibrillated film of claim 1 forming a tape backing further comprising a layer of adhesive on at least one surface of said backing.

10. The microfibrillated film of claim 9 wherein a non-microfibrillated surface of said tape backing is coated with said adhesive.

11. The microfibrillated film of claim 9 wherein a microfibrillated surface of said tape backing is coated with said adhesive.

12. The microfibrillated film of claim 9 wherein both surfaces of said tape backing is coated with said adhesive.

13. The microfibrillated film of claim 9 further comprising a layer of low adhesion backsize.

14. The oriented film of claim 1, wherein said microfibrillated surface comprises polymeric microfibers of average effective diameter of less than 20 microns and having a transverse aspect ratio (width to thickness) of from 1.5:1 to 20:1.

15. The oriented film of claim 1, wherein said microfibrillated surface comprises polymeric fibrous flakes.

16. A filter comprising the microfibrillated film of claim 1.

17. An oil-absorbant article comprising the microfibrillated film of claim 1.

18. A wipe comprising the microfibrillated film of claim 1.

* * * * *

UNITED STATES PATENT AND TRADEMARK OFFICE
CERTIFICATE OF CORRECTION

PATENT NO. : 6,331,343 B1
DATED : December 18, 2001
INVENTOR(S) : Swan, Michael D.

It is certified that error appears in the above-identified patent and that said Letters Patent is hereby corrected as shown below:

Column 4,
Line 15, delete "$\alpha G_m \cong \alpha H_m > 0$" and insert in place thereof -- $\Delta G_m \cong \Delta H_m > 0$ --.
Line 34, delete "norbomene" and insert in place thereof -- norbornene --.

Column 9,
Line 39, delete "maybe" and insert in place thereof -- may be --.

Column 18,
Line 46, under Table 1, insert -- In Table 1, "Control" refers to the oriented film prior to fibrillation. --.

Column 19,
Line 15, under Table 2, insert -- In Table 1, "Control" refers to the oriented film prior to fibrillation. --.
Line 43, under Table 3, insert -- In Table 1, "Control" refers to the oriented film prior to fibrillation. --.
Line 64, under Table 4, insert -- In Table 1, "Control" refers to the oriented film prior to fibrillation. --.

Column 23,
Line 18, delete "comers" and insert in place thereof -- corners --.

Signed and Sealed this

Eighteenth Day of January, 2005

JON W. DUDAS
*Director of the United States Patent and Trademark Office*